(12) United States Patent
Lee et al.

(10) Patent No.: US 7,197,756 B2
(45) Date of Patent: Mar. 27, 2007

(54) OPTICAL DISK HAVING A PROJECTION WITH LATERAL INCLINED SURFACE

(75) Inventors: Seoung Won Lee, Daejeon-si (KR); Hun Seo, Yongin-si (KR); Jun Seok Lee, Jincheon-gun (KR); Jin Hong Kim, Yongin-si (KR); Kyung Chan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/419,160

(22) Filed: Apr. 21, 2003

(65) Prior Publication Data

US 2004/0047280 A1    Mar. 11, 2004

(30) Foreign Application Priority Data

Sep. 10, 2002    (KR) .................... 10-2002-0054603

(51) Int. Cl.
*G11B 7/24*    (2006.01)

(52) U.S. Cl. ..................................... 720/721
(58) Field of Classification Search ............... 720/722, 720/724, 721
See application file for complete search history.

(56) References Cited

U.S. PATENT DOCUMENTS

| 5,323,381 | A | * | 6/1994 | Takahashi et al. | .......... 369/282 |
| 5,859,834 | A | * | 1/1999 | Takahashi et al. | .......... 720/723 |
| 5,999,513 | A | * | 12/1999 | Arakawa et al. | ............ 369/282 |

* cited by examiner

*Primary Examiner*—David Davis
(74) *Attorney, Agent, or Firm*—Harness, Dickey & Pierce, P.L.C.

(57) ABSTRACT

The present invention is directed to an optical disk having a projection that prevents full contact of the upper surface of the disk when engaging a supporting surface. The optical disk includes a projection formed in a central portion of the optical disk that abuts or is near the upper surface of a protecting layer.

12 Claims, 4 Drawing Sheets

US 7,197,756 B2

OPTICAL DISK HAVING A PROJECTION WITH LATERAL INCLINED SURFACE

This application claims the benefit of the Korean Application No. P2002-54603 filed on Sep. 10, 2002, which is hereby incorporated by reference.

BACKGROUND OF THE INVENTION

1. Field of the Invention

The present invention relates to an optical disk having a projection for preventing full contact of the recording side of the disk upon engagement with a supporting surface.

2. Description of the Related Art

Recently, optical disks having various structures with enhanced features and dramatically increased storage capacities have been developed to improve, among other things, their recording density. The currently-used high density optical disks include DVD-R, DVD-RAM, and the like.

FIG. 1 and FIG. 2 illustrate diagrams of a high-density optical disk according to a related art and the dimensions of various elements. These figures show a disk 20 having a thickness of 1.2 mm and a diameter of 120 mm. A via hole 22 is formed at a central portion of the disk 20. The disk 20 has an outer recording layer 10 and a central portion 24 of the disk 20 having the via hole 22. A diameter of the via hole is about 15 mm, and a diameter of the central portion is about 44 mm. The recording layer 10 is formed at a location about 0.1 mm from a surface of the disk 20 on which light is incident.

In the illustrated disk, a protecting layer 30 is formed on the recording layer 10 to protect the recording layer 10. The protecting layer 30 is formed by attaching a transparent plastic film, such as a polycarbonate sheet, to the recording layer 10 or spin-coating a UV-hardening resin on the recording layer 10.

The process of spin-coating on the protecting layer 30 is explained as follows.

First, a UV-hardening resin in a liquid state is dropped on the recording layer 10 adjacent to the central portion 24 of the disk 20. The disk 20 is then rotated at a predetermined spin speed based, in part, on the viscosity of the resin. The spinning disk causes the UV-hardening resin to spread across the recording layer 10 from the central portion to the circumference in response to centrifugal force. Once the resin spreads across the surface of the recording layer 10, the UV-hardening resin coated on the disk is hardened by exposing the resin to UV rays.

However, spin-coating fails to evenly distribute the UV-hardening resin across the recording layer 10 in creating a protecting layer of a uniform thickness. Instead, as illustrated in FIG. 1, the thickness of the UV-hardening resin formed on the recording layer 10 becomes thicker as the protecting layer 10 approaches the outer circumference of the disk 20.

Hence, thickness deviations in the protecting layer 30 interfere with the recording/reading of information on/from the recording layer 10.

SUMMARY OF THE INVENTION

Accordingly, the present invention is directed to an optical disk that substantially obviates one or more problems due to limitations and disadvantages of the related art.

An object of the present invention is to provide an optical disk enabling with a protecting layer having a uniform thickness thereon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical disk according to the present invention includes a plate having a first area enabling to record information thereon and a second area unable to record the information thereon and a projection on the second area of the plate.

The optical disk, according to one embodiment of the invention, includes a first area for recording information thereon, the first area having an outer circumferential edge, an inner circumferential edge and an upper surface; a second area located within the inner circumferential edge of the first area; and, a projection, located within the second area, that vertically extends beyond the upper surface of the first area which prevents full contact with the upper surface of first area when engaging a supporting surface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
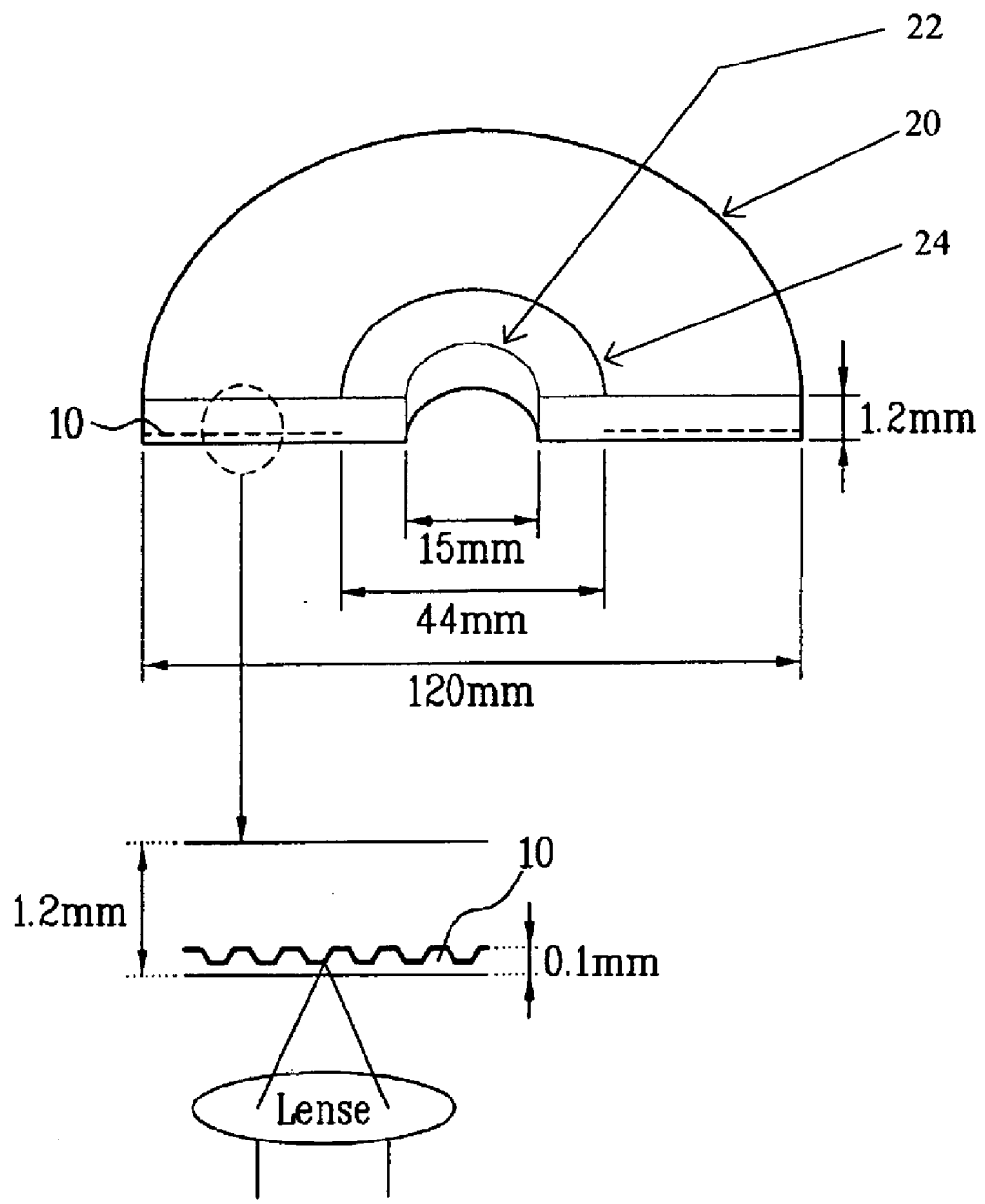
FIG. 1 and FIG. 2 illustrate diagrams of a high-density optical disk according to a related art.
Figure 2:
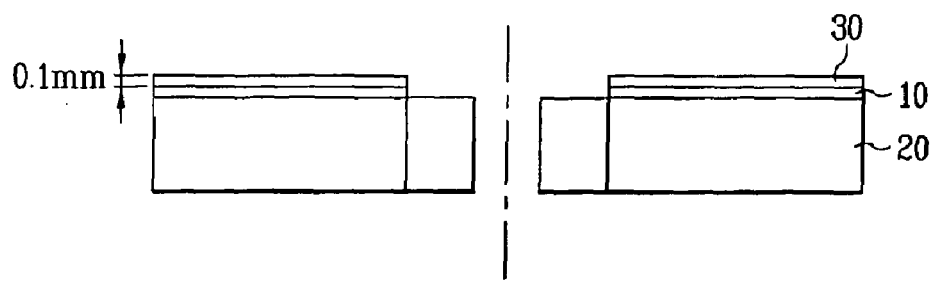
Figure 3:
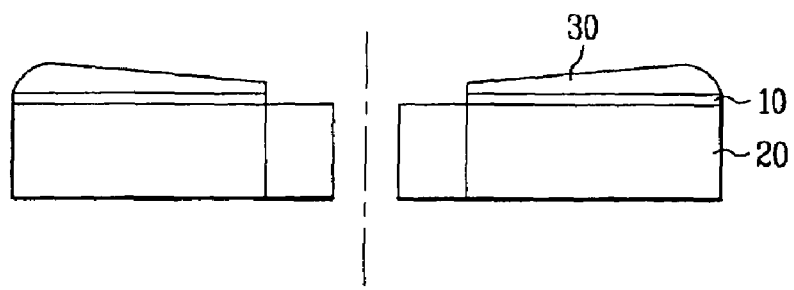
FIG. 3 illustrates a diagram of a thickness of a protecting layer formed by spin-coating.
Figure 4:
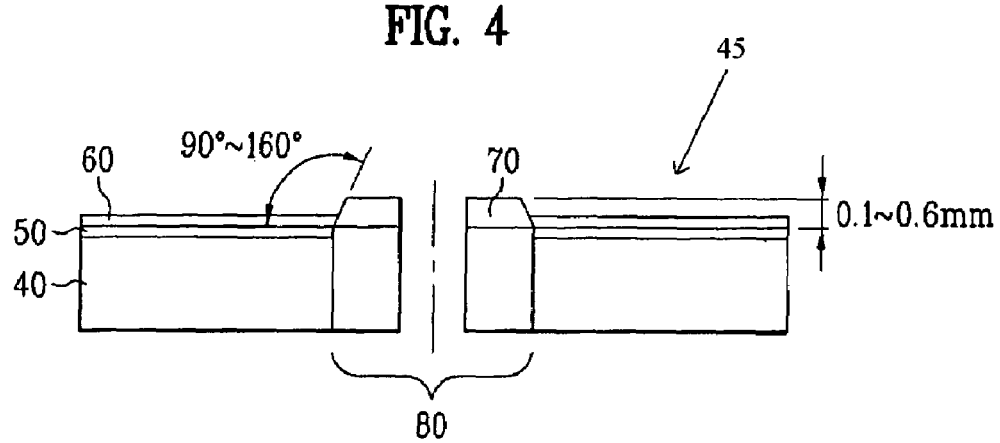
FIGS. 4 to 6 illustrate cross-sectional views of optical disks according to embodiments of the present invention.
Figure 5:
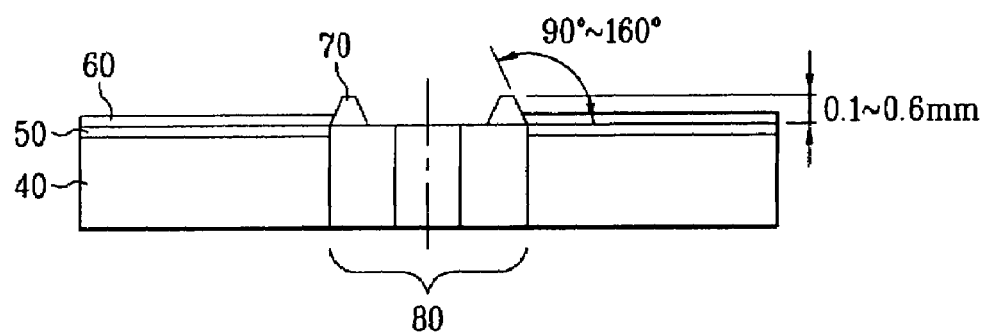
Figure 6:
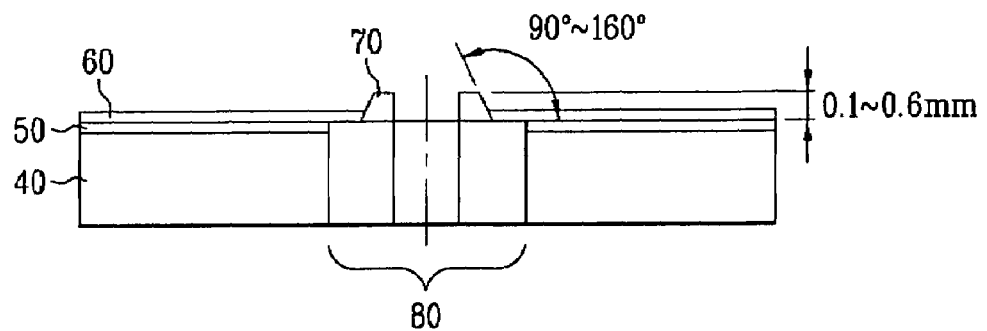

FIGS. 4 to 6 illustrate cross-sectional views of optical disks according to preferred embodiments of the present invention that include various configurations of a projection that facilitates fabrication of the protecting layer and provides protection for the recording surface of the disk once formed.

These figures illustrate an optical disk 45 according to the present invention that includes a first area for recording information thereon and a second area that is not used to record information.

The first area extends to the circumferential edge of the optical disk. In each of the various embodiments, the first area includes a recording layer 50 that is covered by a protecting layer 60. Both of the recording and protecting layers are supported on a substrate, or plate 40.

The second area is located inside the first area of the optical disk in a central portion 80 of the plate 40. In contrast with the first area, neither the protecting layer 50 nor the recording layer 60 extends into the second area. The second area is non-recordable. As reflected in each of the figures, the second area also includes a via hole formed in the central portion 80 of the plate 40 near the rotational center of the optical disk 45.

The second area of the optical disk 20 also includes a projection 70 formed near the circumferential outer edge of the central portion 80. The projection is formed to accomplish at least two functions. As explained later, the structure of the projection facilitates fabrication of the optical disk by preventing material for collecting in the central portion of the disk, such as during the processing of spinning resin to form a protecting layer.

Additionally, the projection serves the function of protecting the recording surface of the desk from scratches and other damages. Each embodiment of the projection is designed to prevent full impact of the disk when engaging a supporting surface, such as the ground.

FIG. 4 illustrates a first preferred embodiment of an optical disk with the projection. There, the projection 70 is formed to have at least one lateral side, which is inclined. A flank angle of the projection 70 is preferably formed to be about 90~160°. The flank angle of the projection 70 is defined as the angle formed between the upper surface of the recording layer 10 and the lateral side of the projection 70 where the vertex of the angle is located at the intersection of the inner circumferential edge of the upper surface of recording layer 50 with the control portion 80. The upper surface of the projection 70 is formed to be higher than the upper surface of the protecting layer 60. For example, when the optical disk has a thickness of 1.2 mm, a diameter of 120 mm, a diameter of the via hole of about 15 mm, and a diameter of the central portion of about 44 mm, a height of the projection 70 is preferably about 0.1~0.6 mm.

FIG. 5 shows a second preferred embodiment of the optical disk 20 where the projection 70 is similar to the embodiment shown in FIG. 4 except the projection 70 includes a second lateral side formed on an inner lateral wall of the projection that is also angled. In a related example, the flank angle of the inner lateral projection wall is equal to the flank angle of the outer lateral projection wall. In this embodiment, the flank angle of the inner wall is measured between the upper surface of the central portion and the inner lateral projection wall.

FIG. 6 shows a third preferred embodiment of an optical disk having a projection that is similar to the preferred embodiment of FIG. 4 except the base of the outer projection wall is offset from the protecting layer 50. In one example, the vertex of the flank angle occurs nearer the center of the optical disk. One side of the flank angle is defined by the upper surface of the central portion 80 that is parallel to the upper surface of the protecting layer 50.

A process for fabricating an optical disk in accordance with a preferred embodiment of the invention having the step of spin-coating a material for forming the protecting layer 60 on the disk having the projection 70 thereon is explained as follows.

Figure 7A:
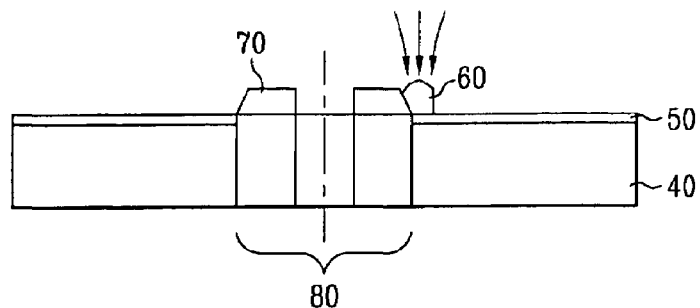
FIG. 7A and FIG. 7B illustrate cross-sectional views of a process of forming a protecting layer of an optical disk according to the present invention.
Figure 7B:
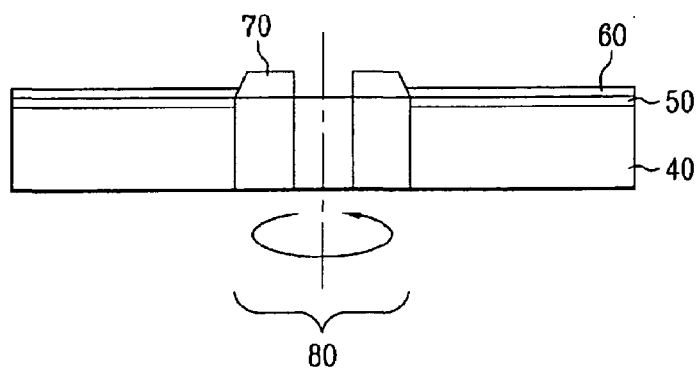
Figure 8:
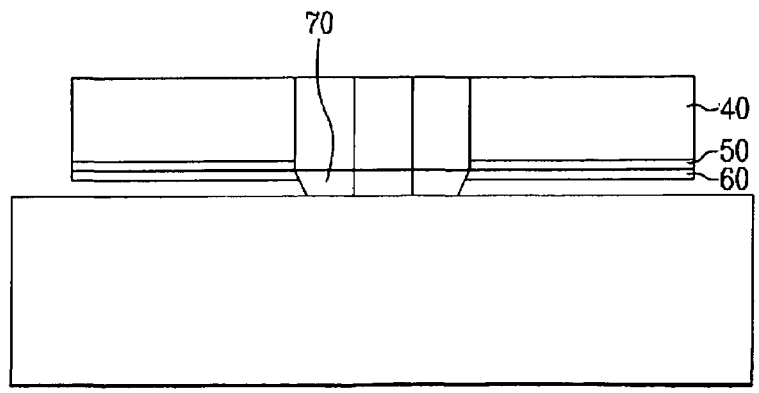
FIG. 8 illustrates a diagram for protecting a disk surface by a projection of an optical disk according to the present invention.

FIG. 7A and FIG. 7B illustrate cross-sectional views of the constituent elements of an optical disk formed by a process according to the present invention.

Referring to FIG. 7A, a liquefied UV-hardening resin 60 is dropped on a recording layer 50 near the projection 70.

Referring to FIG. 7B, the optical disk is spun causing centrifugal force to move the UV-hardening resin coated on the disk from the center portion toward the outer circumferential edge of the first area. The coated UV-hardening resin is then hardened by UV light.

When the step of spin-coating is carried out on the UV-hardening resin, the projection 70 having an inclined lateral side prevents the liquefied UV-hardening resin from flowing into and collecting within the central portion of the disk.

Moreover, the projection 70 maintains a uniform flow of the liquefied UV-hardening resin during spin-coating, thereby enabling the process to form a protecting layer 60 that is uniform in thickness.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical disk comprising:
   a first side being recordable and a second side opposite the first side being non-recordable;
   a recordable first area and a nonrecordable second area, each of which is located between the first and second sides, respectively;
   a recording layer located about 01. mm below a surface of the first side; and
   one continuous projection extending from the first side on the non-recordable second area and around a center hole;
   wherein the projection is formed on a first portion of the non-recordable second area, the first portion being located near one of the center hole and the recordable first area, there remaining at least a second portion on the first side of the non-recordable second area on which the projection is not formed; and
   wherein the projection has at least one inclined lateral side.

2. The optical disk of claim 1, wherein a flank angle of the projection is 90~160°.

3. The optical disk of claim 1, wherein an upper surface of the projection is higher than that of the recordable first area.

4. The optical disk of claim 1, wherein a height, h, of the projection above the recording layer is in a range as follows, (about 0.1 mm)<h<(about 0.6 mm).

5. The optical disk of claim 1, the recordable first area comprising:
   a recording layer to record the information thereon; and
   a protecting layer on the recording layer to protect the recording layer.

6. The optical disk of claim 1, wherein the recordable first area and nonrecordable second area are located on circumferential and central portions of a plate, respectively.

7. The optical disk of claim 1, wherein the projection has a circumferential edge with a diameter equal to or greater than about 15 mm.

8. The optical disk of claim 1, wherein the projection has a circumferential edge with a diameter equal to or greater than about 15 mm and equal to or less than about 44 mm.

9. The optical disk of claim 1, wherein the projection has a circumferential edge with a diameter equal to or greater than about 17 mm and equal to or less than about 21 mm.

10. The optical disk of claim 1, wherein the recordable first area includes a recording layer having an upper surface and a protecting layer formed on the upper surface of the recording layer.

11. The optical disk of claim 1, wherein the height of the projection above the recording layer is less than or equal to about 0.12 mm.

12. The optical disk of claim 11, wherein the height of the projection above the recording layer is less than or equal to about 0.6 mm.

* * * * *

UNITED STATES PATENT AND TRADEMARK OFFICE
CERTIFICATE OF CORRECTION

| | | |
|---|---|---|
| PATENT NO. | : 7,197,756 B2 | Page 1 of 1 |
| APPLICATION NO. | : 10/419160 | |
| DATED | : March 27, 2007 | |
| INVENTOR(S) | : Seoung Won Lee et al. | |

It is certified that error appears in the above-identified patent and that said Letters Patent is hereby corrected as shown below:

Col. 4, line 7, in the third element of Claim 1 - should read as follows:

"a recording layer located about 0.1 mm below a surface of the first side"

Signed and Sealed this
Twenty-second Day of February, 2011

David J. Kappos
*Director of the United States Patent and Trademark Office*